United States Patent
Wurmfeld et al.

(10) Patent No.: US 11,954,668 B2
(45) Date of Patent: *Apr. 9, 2024

(54) AUTOMATIC TELLER MACHINE SYSTEM FOR AUTHENTICATING A USER DEVICE

(71) Applicant: Capital One Services, LLC, McLean, VA (US)

(72) Inventors: David Kelly Wurmfeld, Falls Church, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,730

(22) Filed: Jun. 16, 2022

(65) Prior Publication Data
US 2022/0309486 A1    Sep. 29, 2022

Related U.S. Application Data

(63) Continuation of application No. 16/541,431, filed on Aug. 15, 2019, now Pat. No. 11,397,938.

(51) Int. Cl.
*G06Q 20/32* (2012.01)
*G07F 19/00* (2006.01)
(Continued)

(52) U.S. Cl.
CPC ....... *G06Q 20/3276* (2013.01); *G07F 19/209* (2013.01); *G07F 19/211* (2013.01);
(Continued)

(58) Field of Classification Search
CPC . G06Q 20/3276; G07F 19/209; G07F 19/211; H04L 9/3228; H04L 9/3234; H04L 9/3247; H04W 12/069
(Continued)

(56) References Cited

U.S. PATENT DOCUMENTS

2011/0115747 A1   5/2011   Powell et al.
2011/0238573 A1*  9/2011   Varadarajan ....... G06Q 20/1085
                                                              705/43
(Continued)

OTHER PUBLICATIONS

Al Imran, Md, M. Firoz Mridha, and Md Kamruddin Nur. "OTP based cardless transction using ATM." 2019 International Conference on Robotics, Electrical and Signal Processing Techniques (ICREST). IEEE, 2019. (Year: 2019).*

(Continued)

*Primary Examiner* — Eric T Wong
*Assistant Examiner* — John O Preston
(74) *Attorney, Agent, or Firm* — Bookoff McAndrews, PLLC (57) ABSTRACT

A system includes a customer authentication system and an automatic teller machine (ATM). The ATM includes a display, one or more memory devices storing software instructions, and one or more processors configured to: execute the software instructions to perform operations to display an item on display; store information regarding the item; receive from a customer device captured information regarding the item; receive from the customer device identifying information of a customer; send the identifying information to the customer authentication system; compare the captured information with the information stored in the one or more memory devices; authenticate the customer device based on the comparison; and allow access to the customer account via the ATM after the authentication.

20 Claims, 6 Drawing Sheets

(51) Int. Cl.
*H04L 9/32* (2006.01)
*H04W 12/069* (2021.01)

(52) U.S. Cl.
CPC .......... *H04L 9/3228* (2013.01); *H04L 9/3234* (2013.01); *H04L 9/3247* (2013.01); *H04W 12/069* (2021.01)

(58) Field of Classification Search
USPC ....................................................... 705/4, 44
See application file for complete search history.

(56) References Cited

U.S. PATENT DOCUMENTS

2014/0156526 A1\* 6/2014 Drummond ............ G06K 19/08
235/379
2014/0229373 A1\* 8/2014 Stanley .................. G06Q 20/10
705/41
2015/0088758 A1\* 3/2015 Varadarajan ............ G07F 19/20
705/71

OTHER PUBLICATIONS

Sumanth, C. M. "Securing ATM Transactions Using QR Code based Secure PIN Authentication." International Journal of Scientific Research in Computer Science, Engineering and Information Technology 5.3 (2019). (Year: 2019).\*

Abraham, Abey, et al. "SPAQ: Secure PIN authentication using QR code." 2017 International Conference on Intelligent Computing and Control Systems (ICICCS). IEEE, 2017. (Year: 2017).\*

Screen capture from Vimeo video clip entitled "The worlds first infrared display @CES 2017," 3 pages, uploaded on Jan. 18, 2017 by user "Nerdindustries". Retrieved from Internet: <htlps://vimeo.com/199978939>.

\* cited by examiner

AUTOMATIC TELLER MACHINE SYSTEM FOR AUTHENTICATING A USER DEVICE

CROSS-REFERENCE TO RELATED APPLICATIONS

This application is a continuation of U.S. patent application Ser. No. 16/541,431, filed Aug. 15, 2019, and entitled "AUTOMATIC TELLER MACHINE SYSTEM FOR AUTHENTICATING A USER DEVICE," the entirety of which is incorporated herein by reference.

BACKGROUND

1. Technical Field

The present disclosure relates to automatic teller machine (ATM) technology and, more specifically, to an ATM system for authenticating and allowing account access via a user device.

2. Introduction

A user having a user device (e.g., a smart phone or mobile device) may access an ATM without the need for a physical credit card or a debit card. The user device and identity may be authenticated by the ATM and be discretely paired with the ATM. However, existing wireless protocols are too wide range, and it is difficult to control wireless signal reflections. That is, a purely wireless solution is hard to localize.

There is a need for an ATM system for authenticating and pairing with a user device, such that a user having the user device can securely access the ATM without a credit card or a debit card.

SUMMARY

The disclosed embodiments describe systems for authenticating a user and a user device by an ATM and pairing the ATM with the user device. As such, the user can use the user device securely to access the ATM without a credit card or debit card.

In one embodiment, an automated teller machine (ATM) provided comprising a display, one or more memory devices storing software instructions, and one or more processors configured to execute the software instructions. Execution of the software instructions performs operations to detect, through a detection device configured to detect proximity of a telecommunication device to the ATM, a smart phone of a user, display, in response to detection of the smart phone, a series of images on the display, with a respective time interval for displaying each image in the series of images, receive, from the smart phone of the user, captured time intervals corresponding to times each image in the series of images was displayed, the captured time intervals comprising at least two captured time intervals, determine a match exists between the at least two captured time intervals and displayed time intervals, and allow access to a financial account of the user through the ATM based at least in part on the match. The further operations are operable to receive, from the smart phone of the user, a time interval between display of two images in the series of images and determine the match exists between the time interval received and the time between display of the two images on the display. Further, operations can receive, from the smart phone of the user, a time interval between display of each image in the series of images and determine the match exists between the time interval received between each image in the series of images and the time between display of each of the images on the display. The operations can also be operable to receive, from the smart phone of the user, information extracted from at least one of the series of images and determine the match exists between the information extracted and information on the display. In one instance, an operation is provided to receive identifying information of the user of the smart phone. The identifying information can include at least one of a customer name, a customer billing address, a customer mailing address, a customer account number, a customer phone number, a customer email address, a customer birthday, or a customer social security number. Further, the ATM can comprise an operation to request an indication from a financial service provider device based on the identifying information that the user is authenticated with a mobile application to access a financial account and disallow access to the financial account absent the indication that the user is authenticated. The image can be a video comprising a sequence of static images or an infrared image in various embodiments. Further, the image can include a quick response (QR) code.

In another embodiment, an ATM method is provided that includes executing, on at least one processor of the ATM, instructions that cause the processor to perform operations. The operations can comprise detecting, through a detection device configured to detect proximity of a telecommunication device to the ATM, a smart phone of a user, displaying, in response to detection of the smart phone, a series of two or more images on a display of the ATM, with a respective time interval occurring for displaying each image in the series, determining whether a match exists between captured time intervals, received from the smart phone corresponding to times each image in the series was displayed, and the respective time interval at which each image was displayed, and allowing access to a financial account of the user through the ATM when the match exists. The operations further comprise determining whether the match exists based on a comparison between a time interval captured between display of each image of the series by the smart phone and time between display of each of the images on the display. Further, the operations can comprise determining whether the match exists based on a comparison of information extracted from at least one image and information displayed in the image. Furthermore, the operations can comprise requesting identifying information of the user of the smart phone, requesting an indication from a financial service provider, based on the identifying information, that the user is authenticated with a mobile application on the smart phone to access the financial account, and disallowing access to the financial account absent an indication that the user is authenticated. In another embodiment, a system is provided comprising a processor coupled to a memory that stores instructions that, when executed by the processor, cause the processor to: detect presence of a smart phone of a user, display, in response to detection of the smart phone, a series of two or more images on a display associated with an automated teller machine, with a respective time interval occurring for displaying each image in the series, determine whether a match exists between captured time intervals, received from the smart phone corresponding to times each image in the series was displayed, and the respective time interval at which each image was displayed, and permit access to a financial account of the user when the match exists. The instructions can further cause the processor to request identifying information of the user of the smart phone, request an indication from a financial service provider device, based on the identifying information, as to whether the user is authenticated with a mobile application on the smart phone to access the financial account, and disallow the access to the financial account absent an indication that the user is authenticated. The instructions can also cause the process to compare output of image analysis performed on at least one of the two or more images on the smart phone and the two or more images displayed, and control access to the financial account based on a result the compare.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

BRIEF DESCRIPTION OF THE DRAWINGS

The accompanying drawings, which are incorporated in and constitute a part of this specification, illustrate disclosed embodiments and, together with the description, serve to explain the disclosed embodiments. The drawings are not exhaustive. Instead, emphasis is generally placed upon illustrating the principles of the disclosed embodiments described herein. In the drawings.

DETAILED DESCRIPTION

Systems, methods, and computer-readable storage media configured according to this disclosure are capable of authenticating a user and a user device and pairing an ATM with the user device, such that the user having the user device can securely access the ATM via the user device without a credit card or a debit card. When the user without a credit or a debit card wants to use the ATM, for example, to withdraw money from the ATM, the user and the user device are authenticated. The authentication may be image-based, for example, based on images, patterns and codes (e.g., quick response (QR) codes). A display item may be associated with an ATM. For example, the display item may be an image on a display of the ATM. In other examples, the display may not be part of the ATM. One or more displays separate from the ATMs may be used. For example, a common LED display may be used. In some embodiments, the display item may be at other locations, for example, projected or pointed on a wall, or screens. The display of the item may be initiated upon detecting the user approaching the ATM. The user device captures the image and sends a verification of the image to the ATM. The system may authenticate the user and the user device based on the verification, as well as on other authentication information.

When the user and the user device are authenticated, the ATM and the user device can be paired, allowing the user device to directly communicate with the ATM. After authentication, the user is allowed to use the ATM to perform financial activities associated with a financial account of the user. This may allow the disclosed system to be capable of creating a visual pairing between the ATM and the user device with reduced potential for information intercept.

In some embodiments, the ATM and the user device may directly communicate with each other, for example, via Bluetooth or other near-field communications. In some embodiments, the ATM and the user device may indirectly communicate with each other. For example, the user device may communicate with a financial service system for example via an application on the user device. The financial service system may communicate via a network with the ATM to provide account authentication and other information.

In some embodiments, an ATM may have a liquid crystal display (LCD) with an infrared backlight (e.g., active matrix LCD). Images, patterns, and codes (e.g., quick response (QR) codes) may be invisible to naked eyes but can be captured by a camera of a user device. As such, communications between the ATM and the user device can be secured. This may also provide a way to convey information invisible to the naked eye but discernable by smart phone cameras.

Various specific embodiments of the disclosure are described in detail below. While specific implementations are described, it should be understood that this is done for illustration purposes only. Other components and configurations may be used without parting from the spirit and scope of the disclosure and can be implemented in combinations of the variations provided. These variations shall be described herein as the various embodiments are set forth.

Figure 1:
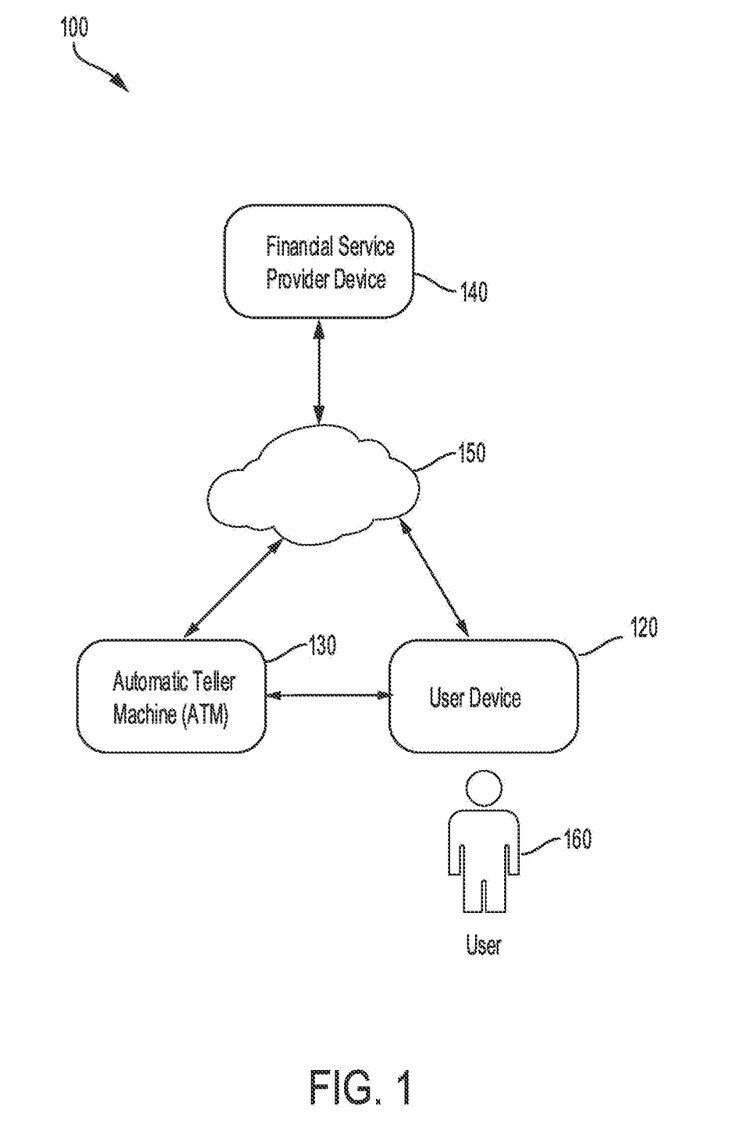
FIG. 1 illustrates a block diagram of an exemplary system, according to one embodiment of the present disclosure.

FIG. 1 is a block diagram illustrating an exemplary system 100 that may be configured for performing authentication according to exemplary embodiments. As shown, the system 100 may comprise a user device 120, an ATM 130, and a financial service provider device 140, each of which may communicate via a network 150. While only one user device 120, ATM 130, and financial service provider device 140 are shown, it will be understood that the system 100 may include more than one user device 120, ATM 130, financial service provider device 140, and network 150.

Each of the devices 120-140 may be a computing system configured to provide, use, and/or process user data. As further described herein, the devices 120-140 may include one or more computing devices (e.g., computer(s), server(s), embedded systems), and memory storing data and/or software instructions (e.g., database(s), memory devices). In some embodiments, the one or more computing devices are configured to execute software instructions stored on one or more memory devices to perform one or more operations consistent with the disclosed embodiments. Each of the devices 120-140 may be configured to communicate with one or more of the devices 120-140. In certain aspects, users may operate one or more of the devices 120-140 to initiate one or more operations consistent with the disclosed embodiments. For example, the user device 120 may be operated by a user 160. The user 160 may be an owner/operator of the user device 120, such as a customer of one or more entities associated with the devices 130 and 140. In other aspects, the user 160 may be an employee of, or associated with, the entity corresponding to the devices 130 and 140 (e.g., someone authorized to use the underlying computing systems or otherwise act on behalf of the entity).

The user device 120 may be one or more computing devices configured to execute software instructions for performing one or more operations consistent with the disclosed embodiments. In one embodiment, the user device 120 may be a mobile device (e.g., tablet, smartphone, etc.), a desktop computer, a laptop, a server, a wearable device (pair of multifunctional eyeglasses, multifunctional watch, etc.), tracking device, chip-enabled payment card, and/or any suitable device with computing capability or a dedicated hardware device.

The user device 120 may include one or more processors configured to execute software instructions stored in memory, such as memory included in the user device 120. The user device 120 may include software that, when executed by a processor, perform known network-related communication and content display processes. For instance, the user device 120 may execute browser software that generates and displays interface screens including content on a display device included in, or connected to, the user device 120. The disclosed embodiments are not limited to any particular configuration of the user device 120. For instance, the user device 120 may be a mobile device that stores and executes mobile applications that provide financial-service-related functions offered by a financial service provider, such as an application associated with one or more financial accounts that a user (e.g., user 160) holds with the financial service provider. The financial application installed thereon, may enable the user device 120 to communicate with the financial service provider device 140 and/or the ATM 130 via network 150. For instance, the user device 120 may be a smartphone or tablet (or the like) that executes a stored mobile application that performs online banking operations.

In other embodiments, the user device 120 may connect to the financial service provider device 140 and/or the ATM 130 through use of browser software stored and executed by the user device 120. The user device 120 may be configured to execute software instructions to allow a user to access information stored in the financial service provider device 140, such as, for example, financial information related to purchase transactions, financial statements, account information, rewards program information and the like. Additionally, the user device 120 may be configured to execute software instructions that initiate and conduct transactions with the financial service provider device 140 or the ATM 130, for example, ATM withdrawals, wire transfers, debit card PIN resets, and call center transactions.

The ATM 130 may be positioned in financial service provider branches or other locations (e.g., retail locations, gas stations, etc.). The ATM 130 may comprise one or more displays, and one or more memory device(s) that store data that may be used for performing one or more processes consistent with the disclosed embodiments. In certain aspects, the ATM 130 may additionally, or alternatively, comprise one or more computer devices. For example, the ATM 130 may include one or more memory device(s) storing data and software instructions and one or more processor(s) configured to use the data and execute the software instructions to perform computing functions and operations known to those skilled in the art.

The ATM may further include computer device(s) that are configured to execute stored software instructions to perform operations associated with generating, presenting, storing, and processing image items, including one or more processes associated with compiling the image items, organizing the image items, and displaying the image items on the one or more displays of the ATM.

The ATM 130 may include one or more computer device (s) that may be a general-purpose computer, server, mainframe computer, or any combination of these components. In certain embodiments, the ATM 130 (or a system including the ATM 130) may be configured as a particular apparatus, system, and the like based on the storage, execution, and/or implementation of the software instructions that perform one or more operations consistent with the disclosed embodiments. The ATM 130 may be standalone, or it may be part of a subsystem, which may be part of a larger system. For example, the ATM 130 may represent distributed servers that are remotely located and communicate over a network (e.g., network 150) or a dedicated network, such as a local area network (LAN). In certain embodiments, a third party may operate the components associated with the ATM 130. Additionally, or alternatively, the ATM 130 may be a part or subpart of the financial service provider device 140.

In some embodiments, the ATM 130 may have one or more LCDs with an infrared backlight (e.g., active matrix LCD). In such a way, the image items (e.g., patterns, and QR codes) may be invisible to naked eyes but can be picked up by the user device 120 (e.g., a smart phone camera of the user device 120 or a scanning device of the user device 120). As such, communications between the ATM 130 and the user device 120 can be secured.

In accordance with disclosed embodiments, the financial service provider device 140 may be a system associated with a financial service provider (not shown), such as a bank, a credit card company, a lender, brokerage firm, or any other type of financial service entity that generates, provides, manages, maintains financial service accounts, etc. for one or more users. The financial service provider device 140 may be one or more computing systems that are configured to execute software instructions stored on one or more memory devices to perform one or more operations consistent with the disclosed embodiments. For example, the financial service provider device 140 may include one or more memory device(s) storing data and software instructions and one or more processor(s) configured to use the data and execute the software instructions to perform server-based functions and operations known to those skilled in the art. The financial service provider device 140 may include one or more general-purpose computers, mainframe computers, or any combination of these types of components.

In some embodiments, the financial service provider device 140 may be configured as a particular apparatus, system, and the like based on the storage, execution, and/or implementation of the software instructions that perform one or more operations consistent with the disclosed embodiments. The financial service provider device 140 may be standalone, or it may be part of a subsystem, which may be part of a larger system. For example, the financial service provider device 140 may represent distributed servers that are remotely located and communicate over a network (e.g., network 112) or a dedicated network, such as a LAN, for a financial service provider.

The financial service provider device 140 may include or may access one or more storage devices configured to store data and/or software instructions used by one or more processors of the financial service provider device 140 to perform operations consistent with disclosed embodiments. For example, the financial service provider device 140 may include a memory configured to store one or more software programs that perform several functions when executed by a processor. The disclosed embodiments are not limited to separate programs or computers configured to perform dedicated tasks. For example, the financial service provider device 140 may include memory that stores a single program or multiple programs. Additionally, the financial service provider device 140 may execute one or more programs located remotely from the ATM 130. For example, the financial service provider device 140 may access one or more remote programs stored in memory included with a remote component that, when executed, perform operations consistent with the disclosed embodiments. In certain aspects, the financial service provider device 140 may include server software that generates, maintains, and provides services associated with financial account management. In other aspects, the financial service provider device 140 may connect separate server(s) or similar computing devices that generate, maintain, and provide services associated with financial data for a financial service provider associated with the financial service provider device 140.

In some embodiments, one or more personalization databases (not shown) may be associated with the financial service provider device 140. The personalization database may include one or more memory device(s) that store data that may be used for performing one or more processes consistent with the disclosed embodiment. In certain aspects, the personalization database may additionally, or alternatively, include one or more servers or other type of computer devices. The personalization database server(s) may be one or more computing devices configured to execute software instructions stored in memory to perform one or more processes consistent with the disclosed embodiments. For example, the personalization database may include one or more memory device(s) storing data and software instructions and one or more processor(s) configured to use the data and execute the software instructions to perform server-based functions and operations known to those skilled in the art.

The personalization database may further include server(s) that are configured to execute stored software instructions to perform operations associated with collecting, storing, and accessing profile data related to the user 160, including one or more processes associated with gathering, for example, data related to the user 160's demographics, accessibility needs, display preferences, and biometrics information. The personalization database may gather the data from a variety of sources, compile the data, and organize the data into easily accessible profiles. The personalization database may include one or more servers that may be a general-purpose computer, a mainframe computer, or any combination of these components. In certain embodiments, the personalization database (or a system including the personalization database) may be configured as a particular apparatus, system, and the like based on the storage, execution, and/or implementation of the software instructions that perform one or more operations consistent with the disclosed embodiments. The personalization database may be standalone, or it may be part of a subsystem, which may be part of a larger system. For example, the personalization database may represent distributed servers that are remotely located and communicate over a network (e.g., network 150) or a dedicated network, such as a LAN.

In some embodiments, the personalization database may be associated with an entity, such as a company, organization, agency, etc. In one embodiment, the personalization database entity may be a different entity than a financial service provider associated with the financial service provider device 140. In certain aspects, a user or user(s) affiliated with a personalization database entity may operate one or more components associated with the personalization database to collect and maintain personalization data. In other embodiments, the personalization database may be associated with a financial service provider or other entity associated with the financial service provider device 140. For example, the personalization database may be a part or subpart of the financial service provider device 140.

The network 150 may comprise any type of computer networking arrangement used to exchange data. For example, the network 150 may be the Internet, a private data network, a virtual private network using a public network, a WiFi network, a LAN or WAN network, and/or other suitable connections that may enable information exchange among various components of the system 100. The network 150 may also include a public switched telephone network ("PSTN") and/or a wireless cellular network. The network 150 may be a secured network or unsecured network. In other embodiments, one or more components of system 100 may communicate directly through a dedicated communication link(s), such as links between the user device 120, the ATM 130, the financial service provider device 140, and the personalization database.

Additionally or alternatively, the network 150 may include a direct communication network. Direct communications may use any suitable technologies, including, for example, Bluetooth™, Bluetooth LE™ (BLE), WiFi, near field communications (NFC), or other suitable communication methods that provide a medium for transmitting data between separate devices. In certain embodiments, the user device 120 and the ATM 130 may connect and communicate through a direct communications network, for example, based on any of the above networking technologies.

The user 160 may use the user device 120 to perform one or more operations consistent with the disclosed embodiments. In one aspect, the user 160 may be a customer or potential customer of a financial service provider associated with the financial service provider device 140. For instance, the financial service provider may maintain a financial service account (e.g., checking account, savings account, credit account, or the like) for the user 160 that the user 160 may use to purchase goods and/or services. The user 160 may transact business with the financial service provider associated with the financial service provider device 140. For example, the user 160 may use the user device 120 and the financial service account (for example, through a mobile application installed on the user device 120) to withdraw cash from or deposit cash into the ATM 130, contact a customer call center, transfer or wire money, or reset their debit account PIN.

The user 160 may further operate the user device 120 in order to be detected and recognized by the ATM 130. For example, the user device 120 may detect, through the network 150, an ATM 130 in its immediate proximity. Additionally, or alternatively, the ATM 130 may detect the user device 120 in its immediate proximity. The user device 120 may then connect to the ATM 130 in order to initiate, conduct, or complete a financial transaction.

Figure 2:
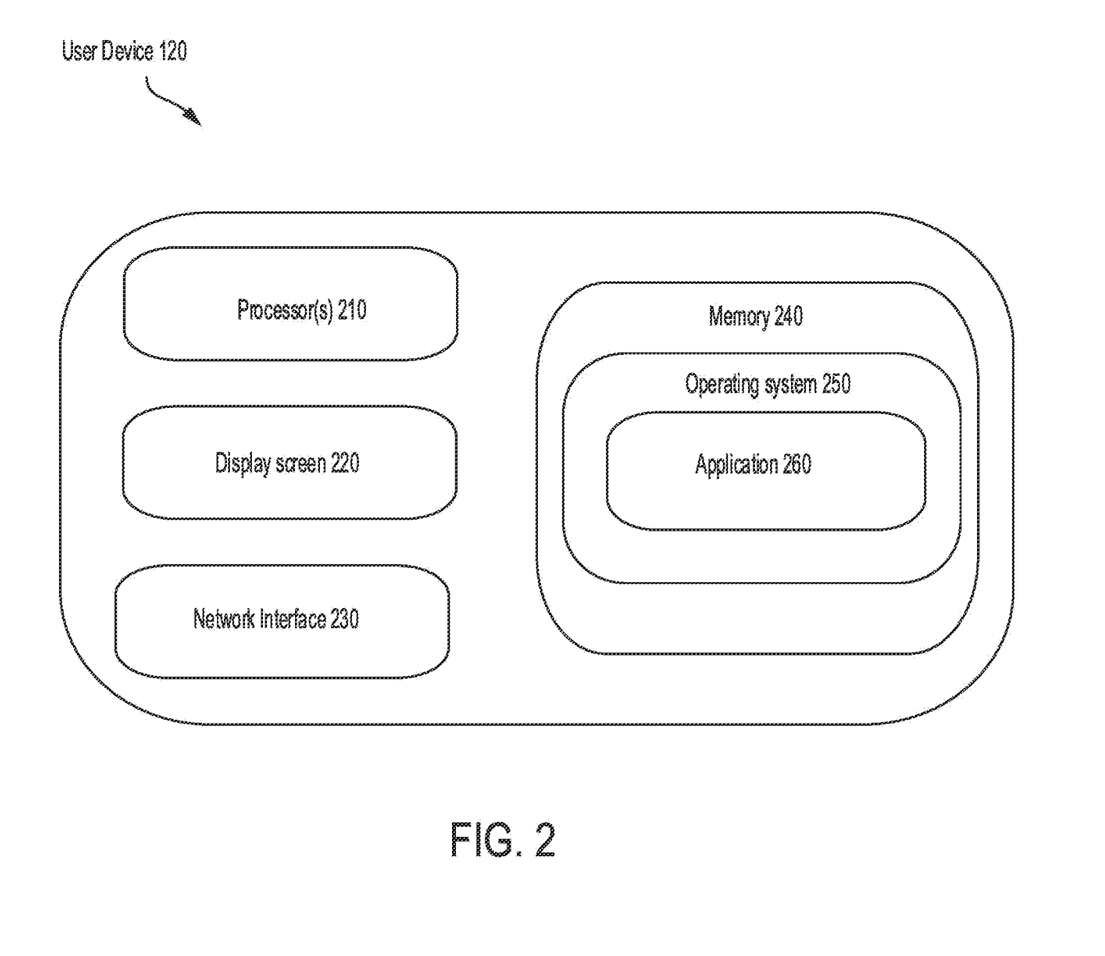
FIG. 2 illustrates a block diagram of a user device, according to one embodiment of the present disclosure.

FIG. 2 is an exemplary block diagram of the user device 120. The user device 120 may be a mobile device with computing capabilities, such as a tablet, a smartphone, a wearable device, or any combination of these devices and/or affiliated components. As shown, the user device 120 may include one or more processors 210, a display screen 220, a network interface 230, and one or more memory devices 240 storing one or more operating systems 250, including a mobile application 260.

The processor(s) 210 may include one or more known processing devices, such as a microprocessor from the Core™, Pentium™, or Xeon™ family manufactured by Intel™, the Turion™ family manufactured by AMD™, the "Ax" or "Sx" family manufactured by Apple™, or any of various processors manufactured by Sun Microsystems, for example. The processor(s) 210 may include one or more known digital signal processors (DSP). The disclosed embodiments are not limited to any type of processor(s) otherwise configured to meet the computing demands required of different components of the user device 120.

The display screen 220 may include, for example, a LCD, a light emitting diode screen (LED), an organic light emitting diode screen (OLEO), a tough screen, or other known display screen. The display screen 220 may display various kinds of information consistent with the disclosed embodiments.

The network interface 230 may allow the user device 120 to send and receive information through the network 150. Alternatively, or additionally, the network interface 230 may establish direct wired or wireless connection between the user device 120 and the other system components, such as the ATM 130, and/or the financial service provider device 140.

The memory 240 may be, for example, a magnetic, semiconductor, tape, optical, removable, non-removable, or other type of storage device or tangible (e.g., non-transitory) computer-readable medium. The memory 240 may store the operating system 250, as well as data and mobile application for performing operations consistent with functions described below.

The operating system 250 may perform known operating system functions when executed by the processor(s) 210. By way of example, the operating system 250 may include Android™, Apple OS X™, Unix™, Linux™ or others. Accordingly, examples of the disclosed embodiments may operate and function with computer systems running any type of operating system running the application 260.

The application 260 may be a mobile application associated with the financial service provider of the financial service provider device 140. The user 160 may conduct various transactions via the application 260 with the financial service provider device 140 and/or the ATM 130, as described above. In some embodiments, the user device 120 may be equipped with scanning and photographing functions, for example, a camera on the user device 120 for taking photos or recording videos of items shown on the display of the ATM 130, and a scanning device on the user device 120 for scanning items shown on the display of the ATM 130 (e.g., QR codes). Accordingly, the application 260 may be programmed to process the captured items, and communicate the processed results of the captured items to the ATM 130. Alternatively, the item processing function may be implemented in a different application with which the application 260 may communicate when the application 260 needs to process items captured from the display of the ATM 130.

Figure 3:
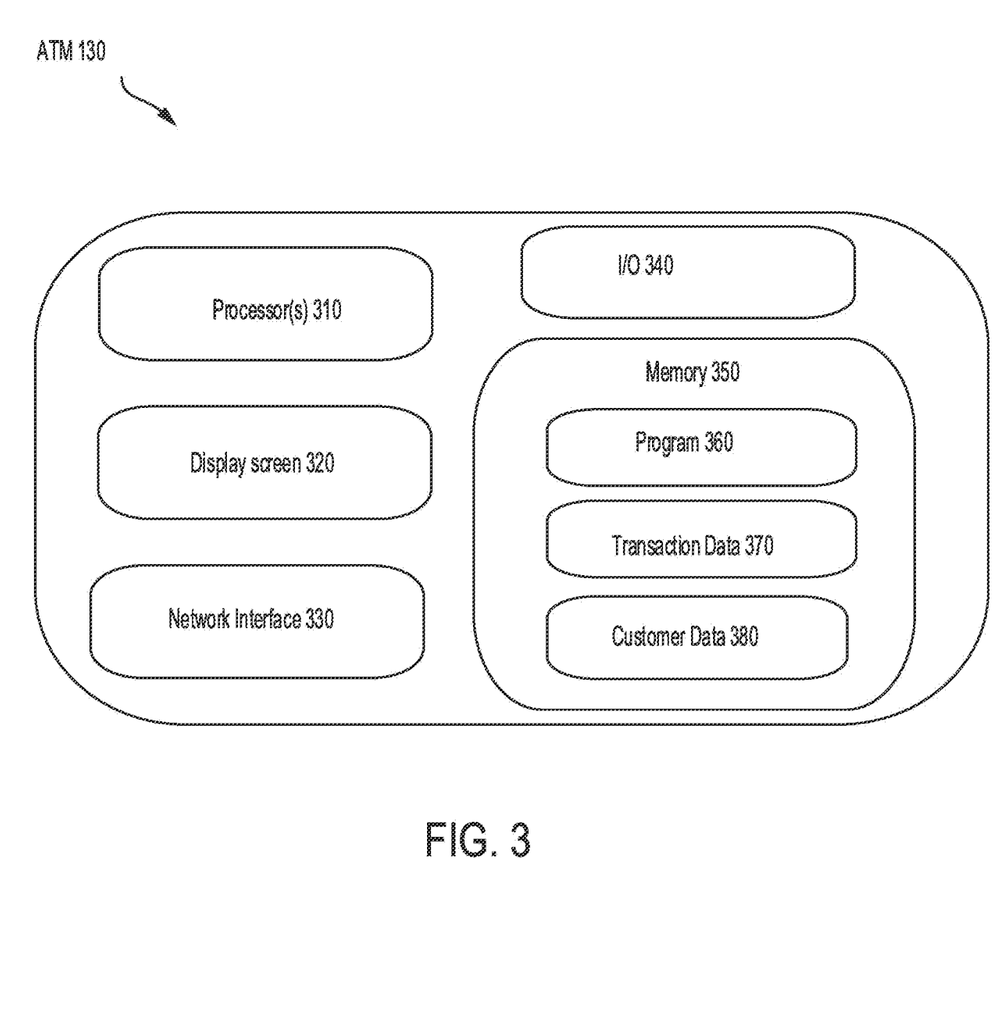
FIG. 3 illustrates a block diagram of an exemplary ATM, according to one embodiment of the present disclosure.

FIG. 3 is an exemplary block diagram of the ATM 130, which may also be used for the financial service provider device 140. The ATM 130 may have one or more processors 310, a display screen 320, a network interface 330, input/output (I/O) devices 340, and one or more memories 350. In some embodiments, the ATM 130 may take the form of a server, general-purpose computer, a mainframe computer, laptop, smartphone, mobile device, or any combination of these components.

The processor 310 may include one or more known processing devices, such as a microprocessor from the Pentium™ or Xeon™ family manufactured by Intel™, the Turion™ family manufactured by AMD™, or any of various processors manufactured by Sun Microsystems. The processor 310 may constitute a single core or multiple-core processor that executes parallel processes simultaneously. For example, the processor 310 may be a single-core processor configured with virtual processing technologies. In certain embodiments, the processor 310 may use logical processors to simultaneously execute and control multiple processes. The processor 310 may implement virtual machine technologies, or other known technologies to provide the ability to execute, control, run, manipulate, store, etc. multiple software processes, applications, programs, etc. In another embodiment, the processor 310 may include a multiple-core processor arrangement (e.g., dual, quad-core, etc.) configured to provide parallel processing functionalities to allow the ATM 130 to execute multiple processes simultaneously. One of ordinary skill in the art would understand that other types of processor arrangements could be implemented that provide for the capabilities disclosed herein. The disclosed embodiments are not limited to any type of processor(s) configured in the ATM 130.

The display screen 320 may comprise any size or form factor display based on any display technology, for example, a LCD, a light emitting diode screen (LED), an organic light emitting diode screen (OLEO), a tough screen, o other known display screen. The display screen 320 may also be a display with an infrared backlight, so items displayed on the display can be invisible to naked eyes but can be captured by the user device 120. The display screen 320 may display various kinds of information consistent with the disclosed embodiments. The display screen 320 may be mounted flush with a wall or other surface or behind a glass barrier (not shown) such that unauthorized devices may be more difficult to attach to the ATM 130 and/or more easily detected.

The network interface 330 may allow the ATM 130 to send and receive information through the network 150. Alternatively, or additionally, the network interface 330 may establish direct wired or wireless connection between the user device 120 and the other system components, such as the financial service provider device 140.

I/O devices 340 may be one or more device that is configured to allow data to be received and/or transmitted by the ATM 130. I/O devices 340 may include one or more digital and/or analog communication devices that allow the ATM 130 to communicate with other machines and devices, such as other components of system 100 shown in FIG. 1. For example, the ATM 130 may include interface components, which may provide interfaces to one or more input devices, such as one or more keyboards, mouse devices, displays, touch sensors, card readers, biometric readers, cameras, scanners, microphones, wireless communications devices, and the like, which may enable the ATM to receive input from an operator of the ATM, such as user 108.

The memory 350 may include one or more storage devices configured to store instructions used by processor 310 to perform functions related to the disclosed embodiments. For example, the memory 350 may be configured with one or more software instructions, such as program(s) 360 that may perform one or more operations when executed by the processor 310. The disclosed embodiments are not limited to separate programs or computers configured to perform dedicated tasks. For example, the memory 350 may include the program 360 that performs the functions of the ATM 130, or the program 360 could comprise multiple programs. Additionally, the processor 310 may execute one or more programs located remotely from the ATM 130. For example, the financial service provider device 140 and the user device 120 may, via the ATM 130 (or variants thereof), access one or more remote programs that, when executed, perform functions related to certain disclosed embodiments. The processor 310 may further execute one or more programs located in the personalization database. In some embodiments, the programs 360 may be stored in an external storage device, such as a cloud server located outside of the ATM 130, and the processor 310 may execute the programs 360 remotely.

The programs 360 executed by the processor 310 may cause the processor 310 to execute one or more processes related to financial services provided to users (e.g., the user 160) including, but not limited to, processing credit and debit card transactions, checking transactions, fund deposits and withdrawals, transferring money between financial accounts, lending loans, processing payments for credit card and loan accounts, processing orders for certified funds, processing orders for new or reissue debit cards, and processing ATM cash withdrawals.

The memory 350 may also store data that may reflect any type of information in any format that the ATM 130 may use to perform operations consistent with the disclosed embodiments. The memory 350 may store instructions to enable the processor 310 to execute one or more applications, such as server applications, network communication processes, and any other type of application or software. Alternatively, the instructions, application programs, etc., may be stored in external storage (not shown) in communication with the ATM 130 via the network 150 or any other suitable network. The memory 350 may be a volatile or non-volatile, magnetic, semiconductor, tape, optical, removable, nonremovable, or other type of storage device or tangible (i.e., non-transitory) computer-readable medium.

The memory 350 may include transaction data 370. The transaction data 370 may include information related to financial transactions initiated by a user. For example, the transaction data 370 may include a user identifier and a transaction type. The user identifier may be a credit or debit card number, and account number, or another means for identifying the user initiating the financial transaction. The transaction type may include an indicator of the type of transaction the user is initiating, such as ATM cash withdrawal, debit PIN reset, money wire or transfer, call to the customer service center, ordering a new or reissue debit card, ordering certified funds, or other transactions requiring user authentication. The transaction data 370 may also include authentication data obtained from the user for the purposes of authorizing the transaction by verifying the authenticity of provided image data as compared to stored image data. Additionally, or alternatively, the transaction data 370 may be stored in the personalization database or in external storage (not shown) in communication with the ATM 130 via the network 150 or any other suitable network.

The memory 350 may further include customer data 380. The customer data 380 may include information about particular customers of the financial service provider. For example, the customer data 380 may include clients' account information, debit or credit card information, history of purchase transactions, financial statements, credit score, risk profile, username and password, debit card PIN, home and work locations, and/or biometric information. Additionally, the customer data 380 may include user device identification information, such as, for example, a phone number, email address, IP address, Bluetooth signature, or other device identifier. Alternatively, the customer data 380 may be stored in the personalization database or in external storage (not shown) in communication with the ATM 130 via the network 150 or any other suitable network.

The processor 310 may analyze transaction data 370 in reference to customer data 380. For example, the processor 310 may analyze the transaction data 370 to determine which client with information stored in the customer data 380 is initiating the financial transaction. The processor 310 may access the particular user's customer information to determine their account information, debit or credit card information, history of purchase transactions, financial statements, credit score, risk profile, username and password, debit card PIN, home and work locations, and/or authentication data.

Figure 4:
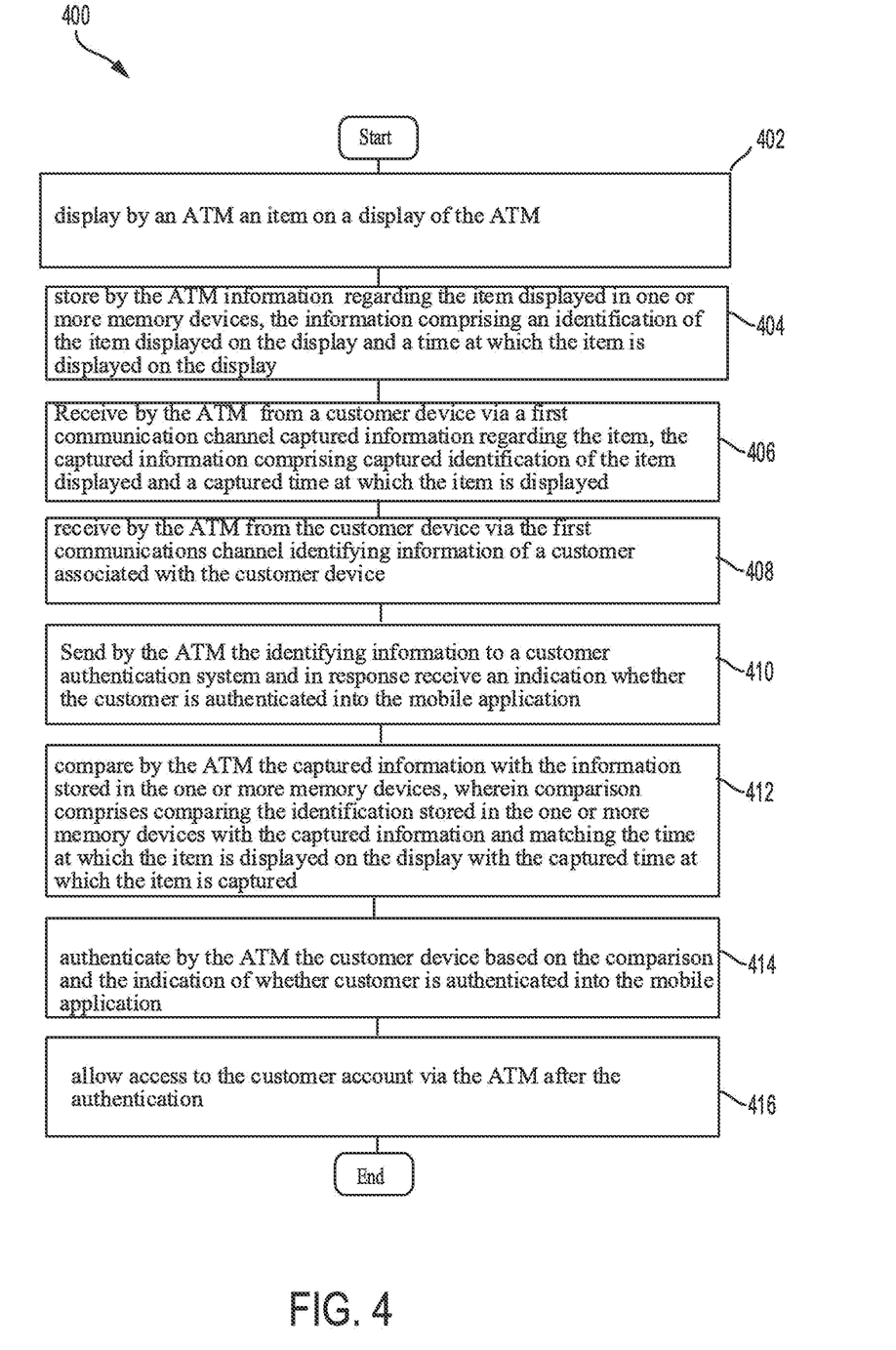
FIG. 4 illustrates a flow chart of an exemplary system process for authenticating a user and a user device and pairing an ATM to the user device.

FIG. 4 illustrates a flow chart of an exemplary system process 400 for authenticating a user and a user device, according to one embodiment of this disclosure. The exemplary system may include a customer authentication system and an ATM. The customer authentication system can be configured to: authenticate a customer to access a customer account via a mobile application on a customer device; and store an indication of whether the customer is authenticated via the mobile application. The ATM may include a display, one or more memory devices storing software instructions, and one or more processors configured to execute the software instructions to perform operations disclosed below. The exemplary system can be the system 100 in FIG. 1. The customer authentication system can be the financial service provider device 140 in FIG. 1. The ATM can be the ATM 130 in FIG. 1.

The process 400 may be performed by processor 310 of the ATM 130 executing instructions encoded on a computer-readable medium storage device for providing ATM functionality. It is to be understood, however, that one or more steps of the process 400 may be implemented by other components of the system 100 (shown or not shown). In addition, one or more steps of the process 400 may be optional, that is one or more steps of the process 400 may not be necessary for authenticating a customer and a user device.

At step 402, the ATM 130 may generate and display an item on the display 320, for example, on an interface of the display 320. The item may be generated randomly or be predetermined by the processor 310 via the program 360. The item may be one of a static image, a dynamic image, and a combination thereof. For example, the static image can be various shapes, symbols, codes, or cartoons, for example, a square, a triangle, an exclamation, a dollar sign, an animal image cartoon, a tree image, a quick response (QR) code, a bar code, etc. The dynamic image may include a short video clip (e.g., less than 5 seconds), a flashing image strobed at a specified or random time interval, etc. The static image may also be patterns, for example, a series of triangle shapes arranged in a certain pattern, a series of symbols arranged in a certain pattern displayed with different timings, etc. The item can also be a series of images displayed with time intervals between each of the series of images.

The item may be generated in advance by the ATM 130 prior to a customer approaching the ATM 130, or may be generated instantly by the ATM 130 upon the customer approaching the ATM 130. For example, the item may be generated in advance and displayed on the display 320 all the time until a customer of the ATM 130 approaches or activates the ATM 130. Alternatively, the item may be generated in advance and displayed on the display 320 for a specified period of time (e.g., 1 minute) and then hibernate (e.g., having a screen saver running) until a customer of the ATM 130 approaches or activates the ATM 130. Alternatively, the item may be generated on-demand by the ATM 130 when a customer of the ATM 130 is detected to approach or activate the ATM 130. For example, a detection device such as a surveillance camera or a motion sensor may detect a customer entering the proximity of the ATM 130. The detection device may issue a corresponding notification. The one or more processors of the ATM 130 may be configured to execute the software instructions to perform operations to receive the notification and display the item in response to receiving the notification.

At step 404, information regarding the item generated and displayed may be stored in the one or more memory devices 350 of the ATM 130. The information may comprise an order in which the item is generated and displayed on the display, a time at which the item is generated and displayed on the display, an identification of the item displayed on the display, and a time interval at which the item is displayed on the display. The item displayed on the display may be captured by the user device 120. The user 160 may capture the item using the user device 120. For example, the user 160 may use a camera of the user device 120 to take a photo of the item, use a scanning device of the user device 120 to scan the item, or use a video recording device of the user device 120 to record the item (e.g., the item being a short video playing on the display).

In some embodiments, when the item is an infrared item displayed on the display of the ATM 130, which is invisible to the naked eye, the user device 120 may be configured and programmed to be capable of capturing and processing such infrared items.

At step 406, the ATM 130 may receive from the user device 120 via a first communication channel (e.g., the network 150 in the system 100) captured information of the item. The captured information of the item may include a captured identification of the item displayed and a captured time at which the item is displayed. The captured information may be part of a processed item result of the captured item processed by the user device 120. For example, after the user 160 captures the item using the user device 120, the captured item may be processed on the user device 120. For example, the user device 120 may run the application 260 to process the captured item or may run a dedicated image processing program to process the captured item. Processing the captured item may involve image recognition, image classification, feature extraction, etc., as known to a skilled person in the art. The processed item result may comprise a copy of the item being captured, the identification of the item displayed, a time at which the item is displayed, a time at which the item is captured, an order at which the item(s) is captured, and a time interval at which the item(s) is captured. The processed item result may also comprise a verification code indicative of the QR code being scanned by the user device 120. The processed item result may be transmitted from the user device 120 to the ATM 130 via the network 150, which may be referred to as a back channel between the user device 120 and the ATM 130. Alternatively, the first communication channel may be a direct communication channel between the user device 120 and the ATM 130, for example, Bluetooth or other near-field communications (i.e., pairing between the user device 120 and the ATM 130).

At step 408, the ATM 130 may receive from the user device 120 via the first communication channel (e.g., the network 150) identifying information of the user 160 who is using or associated with the user device 120. The user 160 may log into the financial service provider device 140 via the application 260 on the user device 120 to retrieve the identifying information and send the identifying information to the ATM 130. The identifying information may comprise any information of the user profile of the user 160 who has a financial account with the financial service provider, as described above. For example, the identifying information may comprise a customer/user name, a customer/user billing address, a customer/user mailing address, a customer/user financial account number, a customer/user phone number, a customer/user email address, a customer/user birthday, and a customer/user social security number, etc. In some embodiments, the identifying information may further include a digital signature of the user 160 from the mobile application on the user device 120.

At step 410, the ATM 130 may send the identifying information received via the first communication channel from the user device to the customer authentication system (e.g., the financial service provider device 140) and, in response, receive an indication from the customer authentication system whether the user/customer is authenticated into the mobile application (e.g., the application 260 of the user device 120). After receiving the identifying information from the ATM 130, the financial service provider device 140 may compare the identifying information received from the ATM 130 with identifying information (e.g., personal or financial account information and the digital signature of the user 160) stored in its memory or the personalization database. If the identifying information received from the ATM 130 matches with identifying information stored in its memory or the personalization database, the financial service provider device 140 sends to the ATM 130 an indication of the customer being authenticated into the mobile application. If the identifying information received from the ATM 130 does not match with identifying information stored in its memory or the personalization database, the financial service provider device 140 sends to the ATM 130 an indication of the customer not being authenticated into the mobile application.

At step 412, the ATM 130 may compare the captured information (part of the processed item result) with the item information stored in the one or more memory devices 350 of the ATM 130. The comparison may comprise comparing the item stored in the one or more memory devices 350 with the copy of the item being captured by the user device 120, comparing the time at which the item is displayed on the display of the ATM 130 with the time at which the item is captured by the user device 120, comparing the time interval at which the item is displayed on the display of the ATM 130 with the time interval at which the item is captured by the user device 120, comparing the identification stored in the one or more memory devices with the captured information and matching the time at which the item is displayed on the display with the captured time at which the item is captured. For example, the ATM 130 may determine whether or not the item stored in the one or more memory devices 350 matches with the copy of the item being captured by the user device 120, whether or not the time at which the item is displayed on the display of the ATM 130 matches with the time at which the item is captured by the user device 120, whether or not the time interval at which the item is displayed on the display of the ATM 130 matches with the time interval at which the item is captured by the user device 120, whether or not the identification stored in the one or more memory devices matches with the captured information, and whether or not the time at which the item is displayed on the display matches with the captured time at which the item is captured.

At step 414, the ATM 130 may authenticate the user device 120 based on the comparison and the indication of whether the user is authenticated into the mobile application. For example, the ATM 130 may authenticate the user device 120 if the comparison may indicate one or more of: the item stored in the one or more memory devices 350 matches with the copy of the item being captured by the user device 120, the time at which the item is displayed on the display of the ATM 130 matches with the time at which the item is captured by the user device 120, and the time interval at which the item is displayed on the display of the ATM 130 matches with the time interval at which the item is captured by the user device 120. The ATM 130 may further authenticate the user device 120 based on the indication which is received from the customer authentication system at step 410. Once the ATM 130 authenticates the user device 120, the ATM 130 may send via the first communication channel authentication information to the user device 120. The authentication information may be indicative of the user device 120 having been authenticated, for example, "this device has been authenticated, and you are allowed to use the ATM now," or a green-colored light symbol may be sent to the user device 120 to indicate the user device 120 has been passed the authentication.

As mentioned above, the first communication channel may be the network 150 or the direct communication between the user device 120 and the ATM 130. If the first communication channel is the network 150, communications between the user device 120 and the ATM 130 may be via the financial service provider device 140. For example, after the user device 120 captures the item displayed on the ATM 130, the user device 120 may send the processed item result of the captured item to the financial service provider device 140 by logging into the mobile application, and the financial service provider device 140 then forwards the processed item result to the ATM 130. If the first communication channel is a direct connection between the user device 120 and the ATM 130, the network 150 may be a second communication channel, for example, for sending and receiving the identifying information.

At step 416, access to the customer account via the ATM can be allowed after the authentication. For example, after the secure direct communication is established between the ATM 130 and the user device 120, the user 160 may use the user device 120 or may directly perform various transactions on the ATM 130, as described above.

Figure 5:
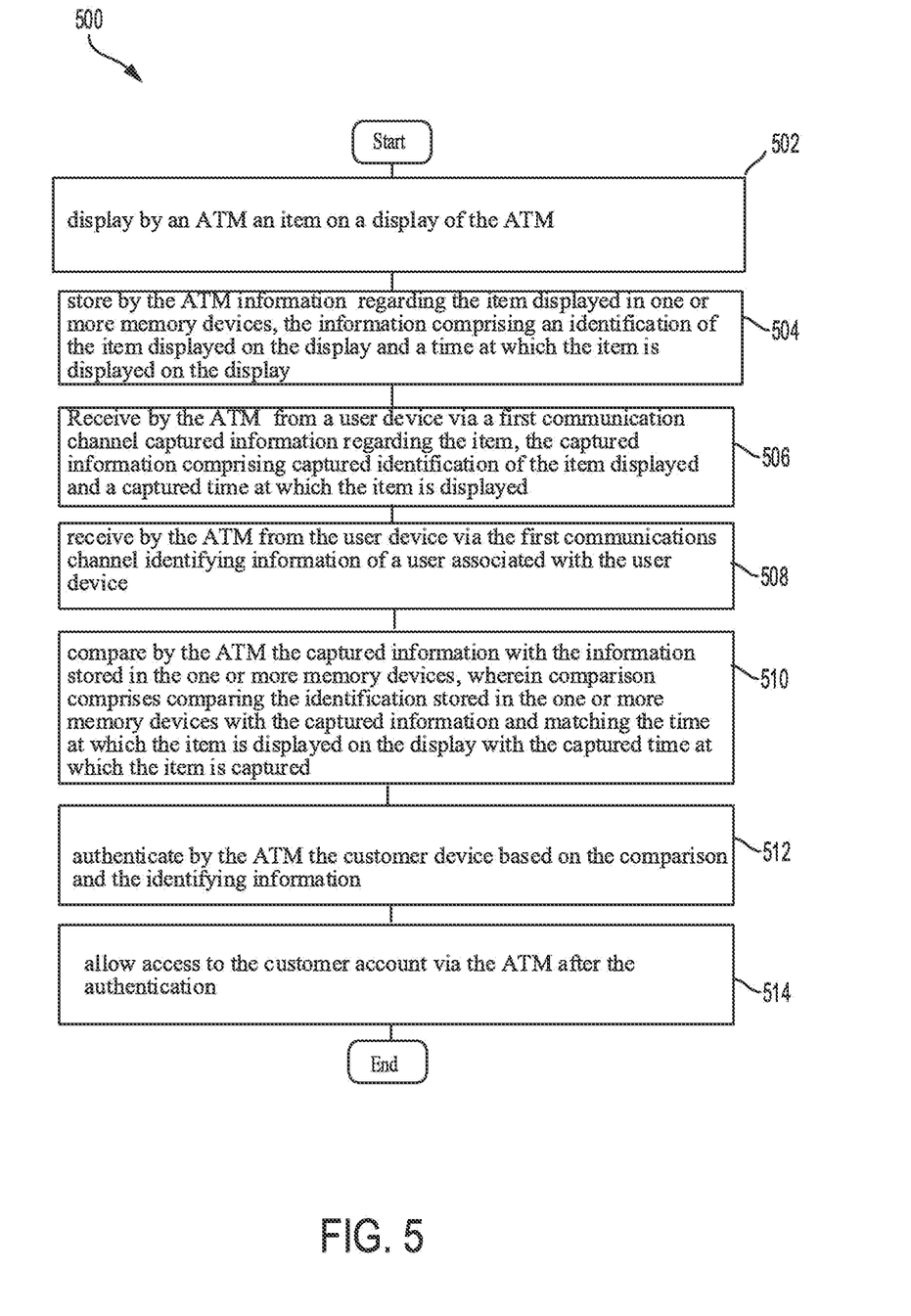
FIG. 5 illustrates a flow chart of an exemplary process for authenticating a user and a user device and pairing the user device to an ATM.

FIG. 5 illustrates a flow chart of an exemplary process 500 for authenticating by the ATM a user device and pairing the ATM to the user device, in accordance with one embodiment of the present disclosure. The process 500 may be performed by the processor 310 of the ATM 130, executing instructions encoded on a computer-readable medium storage device for providing ATM functionalities. It is to be understood, however, that one or more steps of the process 500 may be implemented by other components of the system 100 (shown or not shown). One or more steps of the process 500 may be substantially similar to one or more steps of the process 400. Therefore, details of such steps of the process 500 may not be repeated herein. In addition, one or more steps of the process 500 may be optional, that is one or more steps of the process 500 may not be necessary for authenticating a customer and a user device.

At step 502, the ATM 130 may generate and display an item on the display 320, for example, on an interface of the display 320. The item may be generated randomly or predetermined by the processor 310 via the program 360. The item may be one of a static image, a dynamic image, and a combination thereof. For example, the static image can be various shapes, symbols, codes, or cartoons, for example, a square, a triangle, an exclamation, a dollar sign, an animal image cartoon, a tree image, a quick response (QR) code, a bar code, etc. The dynamic image may include a short video clip (e.g., less than 5 seconds), a flashing image strobed at a specified or random time interval, etc. The static image may also be patterns, for example, a series of triangle shapes arranged in a certain pattern, a series of symbols arranged in a certain pattern displayed with different timings, etc. The item can also be a series of images displayed with time intervals between each of the series of images.

The item may be generated in advance by the ATM 130 prior to a customer approaching the ATM 130, or may be generated instantly by the ATM 130 upon the customer approaching the ATM 130. For example, the item may be generated in advance and displayed on the display 320 all the time until a customer of the ATM 130 approaches or activates the ATM 130. Alternatively, the item may be generated in advance and displayed on the display 320 for a specified period of time (e.g., 30 seconds) and then hibernate (e.g., having a screen saver running) until a customer of the ATM 130 approaches or activates the ATM 130. Alternatively, the item may be generated on-demand by the ATM 130 when a customer of the ATM 130 is detected to approach or activate the ATM 130. For example, a detection device such as a surveillance camera or a motion sensor may detect a customer entering the proximity of the ATM 130. The detection device may issue a corresponding notification. The one or more processors of the ATM 130 may be configured to execute the software instructions to perform operations to receive the notification and display the item in response to receiving the notification. At step 504, information regarding the item generated and displayed may be stored in the one or more memory devices 350 of the ATM 130. The information may comprise an order in which the item is generated and displayed on the display, a time at which the item is generated and displayed on the display, an identification of the item displayed on the display, and a time interval at which the item is displayed on the display.

The item displayed on the display may be captured by the user device 120. The user 160 may capture the item using the user device 120. For example, the user 160 may use a camera of the user device 120 to take a photo of the item, use a scanning device of the user device 120 to scan the item, or use a video recording device of the user device 120 to record the item (e.g., the item being a short video playing on the display).

In some embodiments, when the item is an infrared item displayed on the display of the ATM 130, which is invisible to the naked eye, the user device 120 may be configured and programmed to be capable of capturing and processing such infrared items.

At step 506, the ATM 130 may receive from the user device 120 via a first communication channel (e.g., the network 150 in the system 100) captured information of the item. The captured information of the item may include captured identification of the item displayed and a captured time at which the item is displayed. The captured information may be part of a processed item result of the captured item processed by the user device 120. For example, after the user 160 captures the item using the user device 120, the captured item may be processed on the user device 120. For example, the user device 120 may run the application 260 to process the captured item or may run a dedicated image processing program to process the captured item. Processing the captured item may involve image recognition, image classification, feature extraction, etc., as known to a skilled person in the art. The processed item result may comprise a copy of the item being captured, the identification of the item displayed, a time at which the item is displayed, a time at which the item is captured, an order at which the item(s) is captured, and a time interval at which the item(s) is captured. The processed item result may also comprise a verification code indicative of the QR code being scanned by the user device 120. The processed item result may be transmitted from the user device 120 to the ATM 130 via the network 150, which may be referred to as a back channel between the user device 120 and the ATM 130. Alternatively, the first communication channel may be a direct communication channel between the user device 120 and the ATM 130, for example, Bluetooth or other near-field communications (i.e., pairing between the user device 120 and the ATM 130).

At step 508, the ATM 130 may receive from the user device 120 via the first communication channel (e.g., the network 150) identifying information of the user 160 who is using or associated with the user device 120. The user 160 may log into the financial service provider device 140 via the application 260 on the user device 120 to retrieve the identifying information and send the identifying information to the ATM 130. The identifying information may comprise any information of the user profile of the user 160 who has a financial account with the financial service provider, as described above. For example, the identifying information may comprise a user name, a user billing address, a user mailing address, a user financial account number, a user phone number, a user email address, a user birthday, and a user social security number, etc. In some embodiments, the identifying information may further include a digital signature of the user 160 from the mobile application on the user device 120.

At step 510, the ATM 130 may compare the captured information (part of the processed item result) with the item information stored in the one or more memory devices 350 of the ATM 130. The comparison may comprise comparing the item stored in the one or more memory devices 350 with the copy of the item being captured by the user device 120, comparing the time at which the item is displayed on the display of the ATM 130 with the time at which the item is captured by the user device 120, comparing the time interval at which the item is displayed on the display of the ATM 130 with the time interval at which the item is captured by the user device 120, comparing the identification stored in the one or more memory devices with the captured information and matching the time at which the item is displayed on the display with the captured time at which the item is captured. For example, the ATM 130 may determine whether or not the item stored in the one or more memory devices 350 matches with the copy of the item being captured by the user device 120, whether or not the time at which the item is displayed on the display of the ATM 130 matches with the time at which the item is captured by the user device 120, whether or not the time interval at which the item is displayed on the display of the ATM 130 matches with the time interval at which the item is captured by the user device 120, whether or not the identification stored in the one or more memory devices matches with the captured information, and whether or not the time at which the item is displayed on the display matches with the captured time at which the item is captured.

At step 512, the ATM 130 may authenticate the user device 120 based on the comparison and the identification information. For example, the ATM 130 may authenticate the user device 120 if the comparison may indicate one or more of the items stored in the one or more memory devices 350 matches with the copy of the item being captured by the user device 120, the time at which the item is displayed on the display of the ATM 130 matches with the time at which the item is captured by the user device 120, and the time interval at which the item is displayed on the display of the ATM 130 matches with the time interval at which the item is captured by the user device 120. The ATM 130 may further authenticate the user device 120 based on the identification information by checking whether or not the received identifying information matches with personal or financial account information (e.g., customer data 380) of the user 160 stored in the memory 350 of the ATM 130.

Once the ATM 130 authenticates the user device 120, the ATM 130 may send via the first communication channel authentication information to the user device 120. The authentication information may be indicative of the user device 120 having been authenticated, for example, "this device has been authenticated, and you are allowed to use the ATM now," or a green-colored light symbol may be sent to the user device 120 to indicate the user device 120 has been passed the authentication.

As mentioned above, the first communication channel may be the network 150 or the direct communication between the user device 120 and the ATM 130. If the first communication channel is the network 150, communications between the user device 120 and the ATM 130 may be via the financial service provider device 140. For example, after the user device 120 captures the item displayed on the ATM 130, the user device 120 may send the processed item result of the captured item to the financial service provider device 140 by logging into the mobile application, and the financial service provider device 140 then forwards the processed item result to the ATM 130. If the first communication channel is a direct connection between the user device 120 and the ATM 130, the network 150 may be a second communication channel, for example, for sending and receiving the identifying information.

At step 514, access to the customer account via the ATM can be allowed after the authentication. For example, after the secure direct communication is established between the ATM 130 and the user device 120, the user 160 may use the user device 120 or may directly perform various transactions on the ATM 130, as described above.

Figure 6:
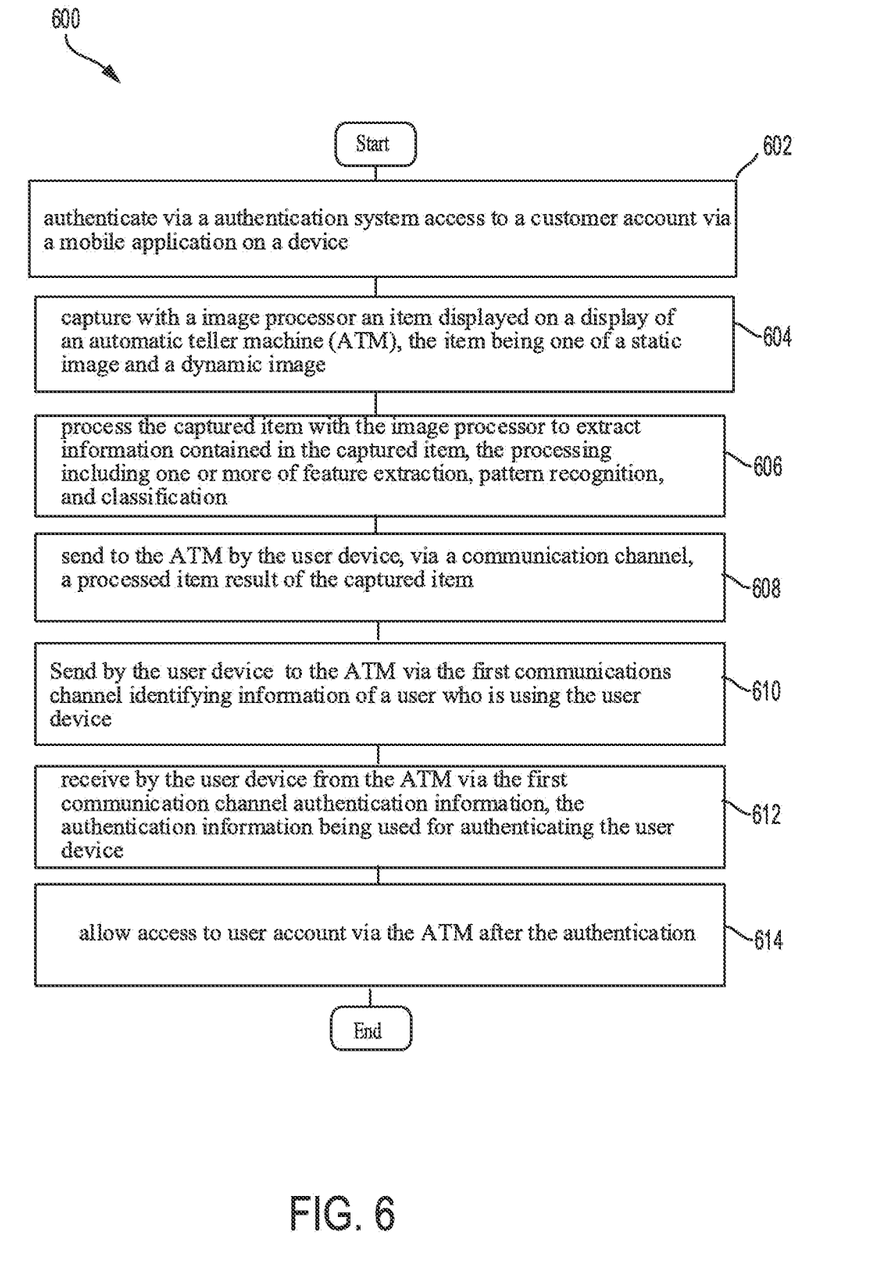
FIG. 6 illustrates a flow chart of an exemplary system process for authenticating a user and a user device and pairing an ATM to the user device.

FIG. 6 illustrates a flow chart of an exemplary process 600 for authenticating a user and a user device and pairing the user device to an ATM, according to one embodiment of this disclosure. The process 600 may be performed by processor 110 of the user device 120 executing instructions encoded on a computer-readable medium storage device for providing user device functionality. It is to be understood, however, that one or more steps of the process 600 may be implemented by other components of the system 100 (shown or not shown). In addition, one or more steps of the process 600 may be optional, that is one or more steps of the process 600 may not be necessary for authenticating a customer and a user device.

The user device 120 may include a network interface, an image processor; one or more memory devices storing software instructions; and one or more processors configured to execute the software instructions to perform operations described below. The financial service provider device 140 in the system 100 can be a customer authentication system that can be configured to authenticate a customer to access a customer account via a mobile application on a customer device and store an indication of whether the customer is authenticated via the mobile application. At step 602, the user device 120 may authenticate via the authentication system access to a customer account via a mobile application on the device. For example, the user device 120 may authenticate the user 160 to access a financial account of the user 160 stored on the financial service provider device 140 by communicating via the application 260 with the financial service provider device 140.

At step 604, the user device 120 may capture via the image processor an item displayed on a display of the ATM 130 to show the item on the display screen 220 of the user device 120. The item may be one of a static image, a dynamic image, or a combination thereof. For example, the static image can be various shapes, symbols, codes, or cartoons, for example, a square, a triangle, an exclamation, a dollar sign, an animal image cartoon, a tree image, a QR code, a bar code, etc. The dynamic image may include a short video clip (e.g., less than 3 seconds), a flashing image strobed at a specified or random time interval, etc. The static image may also be patterns, for example, a series of triangle shapes arranged in a certain pattern, a series of symbols arranged in a certain pattern displayed with different timings, etc. The item can also be a series of images displayed with time intervals between each of the series of images.

For example, when the user 160 having the user device 120 approaches the ATM 130, the item is actively displayed on the display of the ATM 130. The user 160 may capture the item using the user device 120. For example, the user 160 may use a camera of the user device 120 to take a photo of the item, use a scanning device of the user device 120 to scan the item, or use a video recording device of the user device 120 to record the item (e.g., the item being a short video playing on the display of the ATM 130). The user 160 may access capturing devices of the user device 120 via the mobile application. The captured information of the item may include captured identification of the item displayed, and a captured time at which the item is displayed. The captured information may be part of a processed item result of the captured item processed by the user device 120.

In some embodiments, when the item is an infrared item displayed on the display of the ATM 130, which is invisible to the naked eye, the user device 120 may be configured and programmed to be capable of capturing and processing such infrared items.

At step 606, the user device 120 may process the captured item with the image processor to extract information contained in the captured item. For example, the user device 120 may run the application 260 to process the captured item or may run a dedicated image processing program to process the captured item. Processing the captured item may involve image recognition, image classification, feature extraction, pattern recognition, etc., as known in the prior art. The processing may also include identifying an identification of the item, a time at which the item is displayed on the ATM 130, a time at which the item is captured, an order at which the item is captured, a time interval at which the item is captured, dimensions of the item, a shape of the item, etc. The processing may also include digitally signing the processed item result with a digital signature from the mobile application on the user device 120.

At step 608, the user device 120 may send to the ATM 130 via a first communication channel (e.g., the network 150), a processed item result of the captured item. The processed item result may comprise a copy of the item being captured, a time at which the item(s) is captured, an order at which the item is captured, a time interval at which the item(s) is captured, the digital signature on the processed item result, etc. The processed item result may also comprise a verification code indicative of the QR code being scanned by the user device 120. Alternatively, the first communication channel may be a direct communication channel between the user device 120 and the ATM 130, for example, Bluetooth or other near-field communications (i.e., pairing between the user device 120 and the ATM 130).

At step 610, the user device 120 may send to the ATM 130 via the first communication means identifying information of a user who is using the user device 120. The user 160 may log into the financial service provider device 140 via the application 260 on the user device 120 to retrieve the identifying information and send the identifying information to the ATM 130. The identifying information may comprise any information of the user profile of the user 160 who has a financial account with the financial service provider, as described above. For example, the identifying information may comprise a user name, a user billing address, a user mailing address, a user financial account number, a user phone number, a user email address, a user birthday, and a user social security number, etc.

At step 612, the user device 120 may receive from the ATM 130 via the first communication channel authentication information. The ATM 130 may authenticate the user device 120 based on the processed item result of the captured item and the identifying information, as described above. The authentication information can be used for authenticating the user device 120.

The authentication information may be indicative of the user device 120 having been authenticated, for example, "this device has been authenticated, and you are allowed to use the ATM now," or a green-colored light symbol may be sent to the user device 120 to indicate the user device 120 has been passed the authentication.

At step 614, access to the customer account via the ATM can be allowed after the authentication. For example, after the secure direct communication is established between the ATM 130 and the user device 120, the user 160 may use the user device 120 or may directly perform various transactions on the ATM 130, as described above.

In some embodiments, the process 600 may further include receiving a challenge at the mobile application from the ATM; and sending a reply to the challenge to the ATM. The challenge may be a question, and the reply to the challenge can be an answer to the question. The authentication by the ATM may be based on the question and the answer to the question.

Although the above description includes examples for a system including an ATM with a display, the disclosure can be equally applied to Cashier's check Kiosks, Bill Payment Kiosks, ATMs without a display, or other transaction terminals that may or may not have a display, for example, an ATM without a display, a keypad or any place to insert a card which may be a cash-out only device.

In an example embodiment where an ATM is not configured to have a display, the ATM may be configured to have or in communication with a speaker that can play an audio clip, and a user device is configured to be able to record and process the audio clip. The user device may send the processed result of the recorded audio clip to the ATM for authenticating the user device. The processed result of the recorded audio clip may include a digital signature of a user of the user device. After being authenticated, the user device may be used via a mobile application of the user device to perform various financial activities on the ATM, as described above.

In another embodiment, the ATM may be configured to have or in communication with an image capture and processing device. The image capture and processing device can capture an image of a user of a user device and process the image of the user to verify who the user is (e.g., facial recognition). After being authenticated, the user device may be used via a mobile application of the user device to perform various financial activities via the ATM, as described above.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. An automatic teller machine (ATM), comprising:
   a display;
   one or more memory devices storing software instructions; and
   one or more processors configured to execute the software instructions to perform operations to:
   detect, through a detection device configured to detect proximity of a telecommunication device to the ATM, a smart phone of a user;
   display, in response to detection of the smart phone, a series of images on the display, with a respective time interval for displaying each image in the series of images;
   receive, from the smart phone of the user, captured time intervals corresponding to times each image in the series of images was displayed, the captured time intervals comprising at least two captured time intervals;
   determine a match exists between the at least two captured time intervals and displayed time intervals; and
   allow access to a financial account of the user through the ATM based at least in part on the match.

2. The ATM of claim 1, wherein the operations further comprise:
   receive, from the smart phone of the user, a time interval between display of two images in the series of images; and
   determine the match exists between the time interval received and the time between display of the two images on the display.

3. The ATM of claim 1, wherein the operations further comprise:
   receive, from the smart phone of the user, a time interval between display of each image in the series of images; and
   determine the match exists between the time interval received between each image in the series of images and the time between display of each of the images on the display.

4. The ATM of claim 1, wherein the operations further comprise:
   receive, from the smart phone of the user, information extracted from at least one of the series of images; and
   determine the match exists between the information extracted and information on the display.

5. The ATM of claim 1, further comprising an operation to receive identifying information of the user of the smart phone.

6. The ATM of claim 5, wherein the identifying information comprises at least one of a customer name, a customer billing address, a customer mailing address, a customer account number, a customer phone number, a customer email address, a customer birthday, or a customer social security number.

7. The ATM of claim 5, further comprising an operation to request an indication from a financial service provider device based on the identifying information that the user is authenticated with a mobile application to access a financial account.

8. The ATM of claim 7, further comprising an operation to disallow access to the financial account absent the indication that the user is authenticated.

9. The ATM of claim 1, wherein the image is a video comprising a sequence of static images.

10. The ATM of claim 1, wherein the image is an infrared image.

11. The ATM of claim 1, wherein the image includes a quick response (QR) code.

12. An automatic teller machine (ATM) method, comprising:
    executing, on at least one processor of the ATM, instructions that cause the processor to perform operations, the operations comprising:
    detecting, through a detection device configured to detect proximity of a telecommunication device to the ATM, a smart phone of a user;
    displaying, in response to detection of the smart phone, a series of two or more images on a display of the ATM, with a respective time interval occurring for displaying each image in the series;
    determining whether a match exists between captured time intervals, received from the smart phone corresponding to times each image in the series was displayed, and the respective time interval at which each image was displayed; and
    allowing access to a financial account of the user through the ATM when the match exists.

13. The method of claim 12, wherein the operations further comprise determining whether the match exists based on a comparison between a time interval captured between display of each image of the series by the smart phone and time between display of each of the images on the display.

14. The method of claim 12, wherein the operations further comprise determining whether the match exists based on a comparison of information extracted from at least one image and information displayed in the image.

15. The method of claim 12, wherein the operations further comprise requesting identifying information of the user of the smart phone.

16. The method of claim 15, wherein the operations further comprise requesting an indication from a financial service provider, based on the identifying information, that the user is authenticated with a mobile application on the smart phone to access the financial account.

17. The method of claim 15, wherein the operations further comprise to disallowing access to the financial account absent an indication that the user is authenticated.

18. A system, comprising:
a processor coupled to a memory that stores instructions that, when executed by the processor, cause the processor to:
  detect presence of a smart phone of a user;
  display, in response to detection of the smart phone, a series of two or more images on a display associated with an automated teller machine, with a respective time interval occurring for displaying each image in the series;
  determine whether a match exists between captured time intervals, received from the smart phone corresponding to times each image in the series was displayed, and the respective time interval at which each image was displayed; and
  permit access to a financial account of the user when the match exists.

19. The system of claim 18, wherein the instructions further cause the processor to:
  request identifying information of the user of the smart phone;
  request an indication from a financial service provider device, based on the identifying information, as to whether the user is authenticated with a mobile application on the smart phone to access the financial account; and
  disallow the access to the financial account absent an indication that the user is authenticated.

20. The system of claim 18, wherein the instructions further cause the processor to:
  compare output of image analysis performed on at least one of the two or more images on the smart phone and the two or more images displayed; and
  control access to the financial account based on a result the compare.

* * * * *